3,485,640
METHOD OF COLOR COATING NUTSHELLS
Raymond A. Johnson, Stockton, Calif., assignor to Diamond Walnut Growers, Inc., Stockton, Calif., a corporation of California
No Drawing. Filed Dec. 28, 1966, Ser. No. 605,226
Int. Cl. A23l 1/34
U.S. Cl. 99—126                    2 Claims

ABSTRACT OF THE DISCLOSURE

A process of covering the shells of walnuts with a thin layer of an opaque film producing, viscose, edible paint and drying the paint to produce the uniform high-quality opaque color coat over the entire surface of the walnut shells completely hiding the natural color of the shells for presenting a bright decorative color.

---

The present invention relates to an improved method of color coating the shells of walnuts, as well as other edible nuts, to produce colorful, decorative and edible items.

In recent years, colored walnuts have become rather popular during the holiday seasons of Halloween, Thanksgiving, Christmas, and New Years. Not only are they attractive to children as a different form of edible nuts but they also find use as ornaments in various decorations.

The coloring of walnut shells is not as simple as it may appear at first impression. Initially, there are problems created by the cracks between the halves of the walnut shells and other small openings in the nutshells. Such openings must be sealed in order that the dyes employed to color the walnuts do not penetrate the shells and discolor or otherwise impair the quality of the walnut meats.

Secondly, the dyes employed to color the walnut shells must cover and mask the tan color of the shells in order to show the true color of the dyes.

Thirdly, the color coating should be of a character which will not rub off upon handling or discolor items placed in contact with the walnuts.

Finally, all compounds used in the coloring of the walnut shells must be certified for food use and acceptable to the United States Food and Drug Administration.

Methods presently employed to color coat the shells of walnuts and other nuts are rather complex, lengthly, and generally unsatisfactory. In such methods, and as exemplified by U.S. Patent No. 3,057,733, issued Oct. 10, 1962, the walnut shells are first sealed by immersing the walnuts in a tank containing a liquid sealer. The walnuts are then stacked on a rack for a period of time sufficient to allow the sealer to dry. The sealed walnuts are then dipped in a food dye solution and again stacked on a rack until dry. Finally, the color coated walnuts are dipped in a glaze solution which upon drying forms a film over the color coated walnut shells preventing the dye from rubbing off upon handling.

In such methods, the sealing step takes at least one-third of the total time for the color coating operation while drying of the walnuts in stacks tends to produce nonuniform layers of sealer and dye on the walnut shells.

Furthermore, the racks upon which the walnuts are stacked occupy an appreciable amount of floor space and the drying of walnuts thereon is a very slow process which materially limits the rate at which walnuts may be color coated and readied for shipment.

Moreover, the food dyes employed to color coat the sealed walnut shells are soluble and do not completely mask the tan color of the walnut shells to present the true color of the dyes.

In view of the foregoing, it is an object of the present invention to provide a simple and inexpensive method of rapidly color coating the shells of large quantities of nuts.

Another object of the present invention is to provide a method of the foregoing character which produces uniform, high quality decorative colors on the nutshells without discoloring or otherwise damaging the meats of the nuts.

A further object of the present invention is to provide a method of color coating nutshells which combines the separate sealing and coloring steps into a single step, thereby materially reducing the time required to color coat nutshells.

Still another object of the present invention is to provide an improved method of the foregoing character in which a viscous edible paint is employed to simultaneously seal and color the nutshells and which upon drying forms an opaque film completely hiding the natural color of the shells and producing a clear bright color on the shells.

A still further object of the present invention is to provide a method of color coating the shells of nuts which includes tumbling the nuts with a measured amount of an opaque film producing edible paint and drying the tumbling nuts with air jets whereby large quantities of nuts may be rapidly processed and uniformly covered with high quality decorative color coats.

The foregoing as well as other objects and advantages of the present invention may be more clearly understood by reference to the following detailed description of a preferred form of the method for color coating nutshells embodying the features of the present invention.

Generally speaking, the method of the present invention comprises covering the shells of walnuts with a thin layer of an opaque film producing, viscous, edible paint and drying the paint to produce a uniform high quality opaque color coat over the entire surface of the walnut shells which completely hides the natural color of the shells while presenting a bright decorative color. Upon drying of the paint, the color coated walnuts are then covered with an edible glaze and again dried to form a protective coating which prevents the color from rubbing off upon handling or transferring to adjacent articles upon contact.

It should be noted from the foregoing that no separate sealing step is included in the method of the present invention and that an opaque film is produced over the entire surface of a walnut shell to completely cover its natural color. In fact, by employing a viscous edible paint, the separate sealing and coloring steps required by conventional methods, are combined in one operation and one drying step is eliminated from the process.

The edible paint for accomplishing such combined operations and for producing an opaque film upon drying basically comprises a dispersion of a finely powdered, insoluble, food grade pigment, or food grade pigment and a pigment modifier, in an edible liquid vehicle consisting of a binding agent dissolved in a volatile solvent. The solvent functions to dissolve the binding agent and combines therewith to form a viscous liquid which can be applied to the nutshell. The binding agent in turn wets the surfaces of the individual particles of the pigment and pigment modifier and permits the particles to be evenly dispersed in the liquid which, due to its viscous nature, holds the particles in suspension until application to the nutshell and evaporation of the solvent. Upon evaporation of the solvent, the binding agent functions to form a film which holds the pigment particles together and attaches them to the nutshell.

There are many natural and synthetic polymers with properties which fulfill the characteristics necessary for a satisfactory binding agent. These may be classified in the following manner:

(I) Polysaccharides (carbohydrates)
  (A) Natural gums
    (1) Those from the sap or exudate of plants—arabic, karaya, tragacanth, ghatti, and the like.
    (2) Those extracted from seeds—guar, locust quince, psyllium, and the like.
    (3) Those processed from sea weeds—agar, kelp, alginate, Irish moss, and the like.
  (B) Cellulose derivatives
    (1) Sodium salt of carboxymethylcellulose
    (2) Dimethyl ether of cellulose
    (3) Mixed hydroxy propyl-methyl ethers of cellulose
  (C) Starch
(II) Poly peptides (proteins)
  (A) Casein
  (B) Albumin
  (C) Gelatin
  (D) Zein
(III) Synthetics
  (A) Polyvinyl pyrrolidone The preferred binding agent from the foregoing list, which is illustrative only, is the mixed hydroxy propyl-methyl ethers of cellulose, obtainable under the tradename of Methocel 65 HG. Methocel 65 HG is an effective pigment dispersant and dispersion stabilizer, forms a flexible transparent film, and is currently on the acceptable food additive list of the United States Food and Drug Administration. Furthermore, Methocel 65 HG is soluble in water and will form a solution with a viscosity of about 7,000 centipoises at 4% concentration. This is well within the optimum viscosity range for color coating nutshells which has been found to be from about 4,000 centipoises to about 50,000 centipoises at about 20° C. Below 4,000 centipoises there is excessive leakage of coloring liquid into the nutshells and above 50,000 centipoises, there is inadequate coverage of the nutshells. Within the foregoing range, the viscous solution formed by the binding agent and solvent seals any cracks or small holes in nutshells while preventing entry of coloring liquid into the shells to discolor or otherwise impair the meats of the nuts.

In the viscous, edible paint, the pigment is the substance which imparts color to and renders opaque the film formed around the nutshell by the binding agent. In the method of the present invention it is important that the pigments be of food grade accepted by the United States Food and Drug Administration and, in order that the film formed upon evaporation of the solvent be opaque, it is important that the pigments be insoluble. For these reasons, the pigments employed in the method of the present invention comprise food grade titanium dioxide and "lakes" of primary organic dyes currently on the accepted list of the United States Food and Drug Administration.

The term "lakes" applies to organic soluble dyes which have been chemically altered to render them insoluble. More particularly, a "lake" is an insoluble pigment prepared by the interaction of a soluble organic dye, a precipitant, and an absorptive substratum. Currently, the United States Food and Drug Administration approved lakes are the aluminum or calcium salts of organic dyes extended on a substratum of alumina.

By employing such insoluble pigments in a liquid vehicle including the previously referred to binding agent, a suspension of pigment particles is formed which upon evaporation of the solvent forms an opaque film. The opaque film completely hides the natural color of nutshells while producing a bright clear color on the nutshells.

This is in direct contrast to the results obtained in prior methods of color coating nutshells. In such prior methods, dye solutions rather than suspensions are employed an an attempt to color the shells or the sealing coat previously applied to the shells. The tinctorial strength of such soluble dyes, however, is not sufficient to reliably cover the natural color of the nutshells. In fact, the dyes are altered or greyed by the natural color of the nutshells and result in muddy or mottled appearing colors on the shells.

In the preferred form of the edible paint, water is employed as the volatile solvent. Various binding agents, insoluble pigments and soluble pigment modifier are added to water to form the different color paints employed to color coat the nutshells. The following is a chart of certain of the coloring formulas for various viscous, edible paints which may be employed in the method of the present invention. In the chart, the percentage by weights are the percentage by weights in the water solvent and the abbreviation F.D.&C., stands for food, drug, and cosmetic and denotes a select group of dyes approved by the United States Food and Drug Administration for use in coloring foods.

WALNUT COLORING FORMULAS

Blue paint

| | Percent by weight |
|---|---|
| Methocel 65 HG | 4.0 |
| Titanium dioxide | 0.6 |
| F.D. & C. Blue #1 | 0.3 |

Red paint

| | |
|---|---|
| Methocel 65 HG | 4.0 |
| F.D. & C. Red #3 Lake | 2.7 |
| F.D. & C. Yellow #6 Lake | 0.3 |

Yellow paint

| | |
|---|---|
| Methocel 65 HG | 4.0 |
| F.D. & C. Yellow #5 Lake | 3.0 |
| Titanium dioxide | 0.23 |

Orange paint

| | |
|---|---|
| Methocel 65 HG | 4.0 |
| F.D. & C. Yellow #5 Lake | 1.5 |
| F.D. & C. Yellow #6 | 0.2 |

Green

| | |
|---|---|
| Methocel 65 HG | 4.0 |
| F.D. & C. Blue #1 Lake | 1.0 |
| F.D. & C. Yellow #5 Lake | 2.0 |
| Titanium dioxide | 0.5 |

As in conventional methods of color coating nuts, the glaze functions to impart a sheen to the color coat on the nutshells and to prevent the color from rubbing off upon handling. In the method of the present invention, any edible resinous or waxy substance possessing the foregoing properties may be employed as the glaze. Preferably however, confectioners glaze is utilized to cover the color coat. Confectioners glaze is commercially available and fulfills the above-listed glaze functions. Confectioners glaze consists of a solution of bleached shellac (21.44% by weight) dissolved in specially denatured ethyl alcohol (78.56% by weight). The specially denatured alcohol is prepared by adding 35 parts of ethyl acetate to 100 parts of 190 proof ethyl alcohol.

By the method of the present invention, large quantities of walnuts or other nuts may be rapidly processed with minimum time required for drying after painting and coating with the glaze solution. Preferably this is accomplished by tumbling or rotating the nuts as the paint and glaze is applied thereto and by thereafter or simultaneously directing air jets at the tumbling walnuts. Although various machines may be employed to tumble or rotate the walnuts, standard panning machines, such as employed in the manufacture of candy, have been found to be particularly useful for this purpose.

Accordingly, to color coat a large quantity of walnuts, for example, 100 pounds of walnuts, the walnuts are first placed in the container or receptacle of a panning machine. The panning machine is then operated to rotate and tumble the walnuts, the panning machine turning at approximately 30 to 40 revolutions per minute. While the nuts are tumbling, about two gallons of premixed viscous, edible paint is added to the panning machine to apply a uniform, thin layer of the paint to the outer surfaces of the tumbling nutshells. The viscous paint seals any cracks or small holes in the shells without entering the nuts.

After the paint has been added to the panning machine, warm air jets are directed at the tumbling nuts and continued until the nuts are dried. That is, the air jets are continued until the water has evaporated and the binding agent has formed an opaque film over the entire surface of the walnuts to color coat the walnut shells.

The dry color coated walnuts are then transferred to a clean panning machine and while the nuts are rotated, approximately 30 fluid ounces of confectioners glaze is added to the machine. Air jets are again directed into the panning machine until the surfaces of the nutshells are wetted with the glaze.

The panning machine is then stopped and the air jets shut off. After a period of about 10 minutes, the panning machine is momentarily turned on to reposition the walnuts. In about 25 minutes, the walnuts are dry and ready for removal from the panning machine for packaging.

The tumbling of the walnuts while the edible paint and glaze solutions are applied thereto insures that the walnuts will be covered by uniformly thin layers of paint and glaze. The tumbling action also produces a maximum dispersion of the paint and glaze to permit relatively small measured quantities of paint and glaze to be employed. This reduces the amount of waste products from the color coating method and reduces the over-all cost of color coating walnuts.

The jetting of air at the tumbling walnuts to uniformly and rapidly dry the walnuts, represents a substantial advance over conventional methods for color coating nuts. In particular, the use of air jets eliminates the need for stacking walnuts on open racks for drying and materially reduces the time required to dry walnuts.

From the foregoing, it is appreciated that the present invention provides an improved, simple, and inexpensive method for rapidly and simultaneously coating large quantities of nutshells with uniform high quality decorative colors without discoloring or otherwise damaging the meats of the nuts contained in the shells. This is accomplished without requiring a separate sealing step for closing any cracks or holes in the nuts prior to coloring the nuts and without requiring the use of separate drying racks or prolonged drying periods.

While a particular method for color coating walnuts has been described in some detail herein, it is appreciated that changes and modifications may be made in the described method without departing from the spirit of the invention. Moreover, the method is equally useful in coolring various typs of nuts other than walnuts. Accordingly, it is intended that the present invention be limited in scope only by the terms of the following claims.

I claim:
1. A process for simultaneously color coating and sealing the shells of walnuts without allowing color penetration into the shell through cracks or the cleavage between the halves thereof, comprising the steps of:
    coating the outer surface of walnut shells with an opaque suspension comprises particles of an insoluble pigment in suspension in a liquid vehicle, said liquid vehicle consisting of a binding agent dissolved in a volatile solvent, said suspension having a viscosity in a range of about 4,000 to 50,000 centipoises at about 20° C., said pigment being selected from a group consisting of food grade titanium dioxide and a "lake" of an organic dye; and
    evaporating the volatile solvent to form a film holding said insoluble pigment particles together on said walnut shells.

2. The process of claim 1 wherein said insoluble, edible pigment comprises a lake of an organic dye.

References Cited

UNITED STATES PATENTS

| 2,020,533 | 11/1935 | Zaloom | 99—126 |
| 2,218,713 | 10/1940 | Kelly et al. | 99—126 |
| 3,057,733 | 10/1962 | Frost | 99—126 |

RAYMOND N. JONES, Primary Examiner

R. M. ELLIOTT, Assistant Examiner